Figures 1, 2:
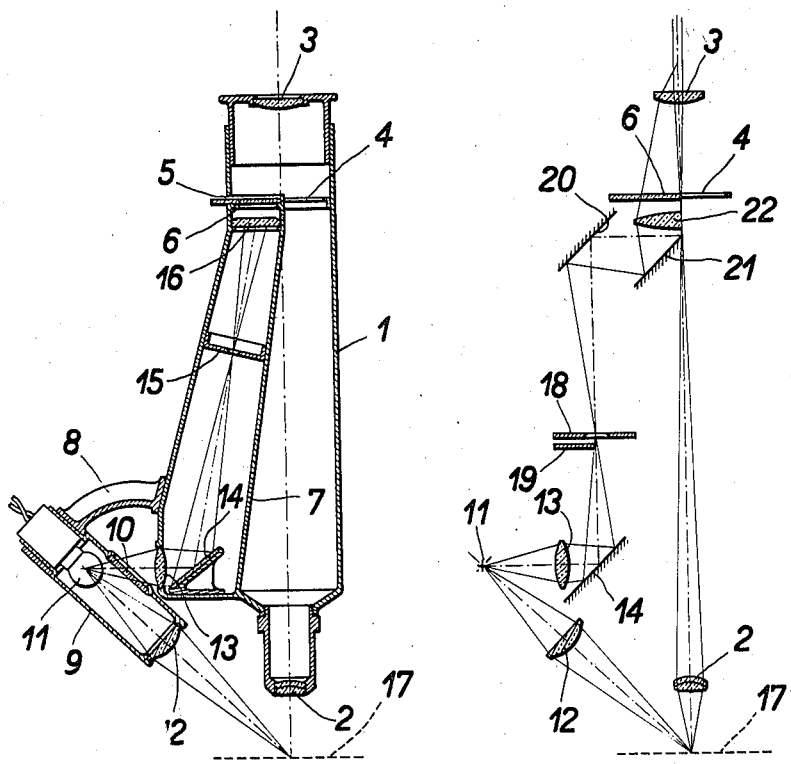

March 17, 1936.   F. HAUSER   2,034,096
MICROSCOPE FOR THE EXAMINATION OF SURFACES Filed March 9, 1935

Inventor:
Friedrich Hauser.

Patented Mar. 17, 1936

2,034,096

UNITED STATES PATENT OFFICE 2,034,096

MICROSCOPE FOR THE EXAMINATION OF SURFACES

Friedrich Hauser, Jena, Germany, assignor to the firm Carl Zeiss, Jena, Germany

Application March 9, 1935, Serial No. 10,244
In Germany March 16, 1934

4 Claims. (Cl. 88—39)

The invention for which I have filed an application in Germany March 16, 1934 concerns a microscope for the examination of surfaces, for instance worked metal surfaces, the examination consisting in comparing the microscopically enlarged image of the surface to be examined to a standard surface represented on an enlarged scale by the image layer of a diapositive. The examination can be effected by means of a microscope in which, according to the invention, the diapositive is so disposed in the image plane of the microscope objective that it covers part of the field of view seen in the microscope eye-piece and that, as a consequence, the standard surface is visible in the field of view of the microscope, next to the surface to be examined. When the magnification of the image of the standard surface is adapted to the magnification of the image of the surface under examination, which is effected by the microscope objective, the said two surfaces can be readily compared to each other for instance as regards the qualities of the working.

It has proved to be especially suitable to provide a common source of light for the illumination of both the object to be examined and the diapositive. The source of light is generally an artificial one, preferably the incandescent filament of a glow-lamp. To obtain a good illumination of the surfaces to be compared with each other, it is advisable to image the source of light approximately in the object plane of the microscope by means of an optical system and approximately in the plane of a diaphragm by means of another optical system, the latter image being used as a secondary source of light for the illumination of the diapositive. When the light rays emanating from this secondary source of light are made to strike the diapositive direct, this diapositive is not illuminated very favorably on account of the pencil of light rays striking it being diverged. Many of these diverged rays cannot be received by the microscope eye-piece and are therefore lost. For this reason, it is advantageous to image the secondary source of light approximately in the microscope eye-piece by means of a condenser system disposed in front of the diapositive in the path of the illumination rays. The illumination of the diapositive is thus made to correspond to the usual illumination of the object in an apparatus for diascopic projection. The diapositive lies in a convergent pencil of illumination rays which substantially traverse the exit pupil of the microscope eye-piece and can therefore enter the observer's eye at the eye-piece. A favorable illumination of the diapositive can be obtained also by disposing a diffusing filter in front of the diapositive in the path of the illumination rays. The illumination rays emanating from the secondary source of light and striking the said filter are diffused, the observer at the eye-piece of the microscope seeing the diapositive on a uniformly illuminated background.

The accompanying drawing represents two constructional examples of the invention. Figure 1 shows the first constructional example in central elevational section, and Figure 2 schematically illustrates the second constructional example in a corresponding position.

The first constructional example (Figure 1) has a microscope tube 1 in which a microscope objective 2 and an adjustable microscope eye-piece 3 are disposed in the usual manner. The image plane of the objective 2 and the area of the field of view are determined by a diaphragm 4. Into a slot 5, which extends over half the circumference of the tube 1, a diapositive, whose image layer represents a standard surface on an enlarged scale, is so introduced that this image layer lies in the plane determined by the diaphragm 4. Below the diapositive 6, a separating wall 7 divides the tube 1 into an observation and an illumination chamber. The tube 1 is provided with a lateral arm 8, which holds a lamp housing 9 inclined relatively to the axis of the microscope objective 2. In the lamp housing 9, whose side facing the tube 1 has a window 10, is displaceably disposed a glow-lamp 11, this lamp 11 being behind the said window 10. The lower end of the housing 9 is covered by a converging lens 12. In that wall of the tube 1 which is in front of the window 10 is mounted a converging lens 13. Behind this lens 13, in the illumination chamber, is provided an inclined reflector 14. Above this reflector 14 is a diaphragm 15, and the upper end of the illumination chamber is covered by a frosted glass disc 16.

When using the microscope, the glow-lamp 11 is connected to a source of current and displaced in the housing 9 until the image of the incandescent filament of the lamp 11, which is produced by the lens 12, is approximately concentric to the optical axis of the microscope objective 2. The microscope is now so placed above a surface 17 to be examined that this surface intersects the axis of the microscope objective 2 at right angles at the locus of the image of the incandescent filament. The objective 2 produces in the plane of the diaphragm 4 an image of the surface 17. The lens 13 is given such a focal length that the incandescent filament of the lamp 11 is imaged by this lens 13 and the reflector 14 in the aperture of the diaphragm 15, the light rays that emanate from the glow-lamp 11 traversing the window 10. The illuminated aperture of the diaphragm 15 represents the secondary source of light, and the rays emanating from this aperture illuminate the entire surface of the frosted glass disc 16. An observer looking through the eye-piece 3 sees on the frosted glass disc 16, which represents a light background, the diapositive 6 next to the image of the surface 17 to be examined, which lies in the plane of the diaphragm 4. Accordingly, the surface 17 can be compared to the standard surface in an extremely simple manner.

The second constructional example (Figure 2) differs from the first constructional example only by the different construction of its optical members effecting the illumination of the diapositive 6. As in the first example, the rays emitted by the source of light 11 are combined by means of a converging lens 13 and an inclined reflector 14 to an image of the source of light in the aperture of an iris diaphragm 18, in which case, however, the one half of the imaging ray pencil is stopped down by a diaphragm 19 disposed in front of the iris diaphragm 18. Accordingly, the secondary source of light in the illuminated aperture of the iris diaphragm 18 is semicircular. The illumination rays emitted by this secondary source of light represent a diverging ray pencil and are directed by means of two reflectors 20 and 21 to half a condenser lens 22 disposed in front of the diapositive 6 in the path of the illumination rays. The illumination rays are combined by the said lens 22 to an image of the source of light, which lies approximately in the exit pupil of the microscope eye-piece 3, and the converging rays traverse the diapositive 6 and illuminate the image layer of this diapositive 6. The microscope is used in quite the same manner as the one according to the first constructional example. A comparison of the surface 17 to be examined and the standard surface represented by the image layer of the diapositive 6 is as simple as the one which can be effected by means of a microscope constructed according to the first constructional example.

I claim:

1. A microscope for the examination of surfaces, consisting of a housing, at least one microscope objective, a microscope eye-piece, a diapositive so disposed in the said housing as to cover approximately half the microscopic image field, a source of light, an optical system for illuminating the said diapositive, and an optical system for illuminating the surface to be examined.

2. A microscope for the examination of surfaces, consisting of a housing, at least one microscope objective, a microscope eye-piece, a diapositive so disposed in the said housing as to cover approximately half the microscopic image field, a source of light, an optical system for illuminating the said diapositive, a diaphragm disposed between the said optical system and the said diapositive, the said optical system imaging the said source of light on the said diaphragm, and an optical system for illuminating the surface to be examined.

3. In a microscope according to claim 2, a diffusing filter disposed between the said diaphragm and the said diapositive.

4. In a microscope according to claim 2, a condenser system so disposed in the path of illumination rays and in front of the said diapositive that the said diaphragm is imaged by this condenser system approximately in the light exit aperture of the said eye-piece.

FRIEDRICH HAUSER.